(12) United States Patent
Pindus et al.

(10) Patent No.: US 7,305,875 B1
(45) Date of Patent: Dec. 11, 2007

(54) METHOD AND APPARATUS FOR MEASURING THE VOLUME OF FUEL IN A TANK

(75) Inventors: Gerald Pindus, 78-40 164th St., Flushing, NY (US) 11366; Alan Husson, Troy, ME (US); Jeffrey Carleton, Glen Head, NY (US); Lee Hoffman, New York, NY (US)

(73) Assignee: Gerald Pindus, Flushing, NY (US)

( * ) Notice: Subject to any disclaimer, the term of this patent is extended or adjusted under 35 U.S.C. 154(b) by 151 days.

(21) Appl. No.: 11/095,914

(22) Filed: Mar. 31, 2005

(51) Int. Cl.
*G01F 17/00* (2006.01)

(52) U.S. Cl. ...................................... 73/149

(58) Field of Classification Search ................ 73/149, 73/290 V; 702/156, 166
See application file for complete search history.

(56) References Cited

U.S. PATENT DOCUMENTS

| | | | |
|---|---|---|---|
| 3,995,168 A | 11/1976 | Neuscheler et al. | |
| 4,487,066 A | 12/1984 | Pardi et al. | |
| 4,570,484 A | 2/1986 | Sokalski | |
| 4,689,991 A | 9/1987 | Beckley et al. | |
| 4,870,292 A | 9/1989 | Alpert et al. | |
| 4,904,878 A | 2/1990 | Gipp et al. | |
| 4,908,783 A | 3/1990 | Maier | |
| 5,015,995 A | 5/1991 | Holroyd | |
| 5,056,017 A * | 10/1991 | McGarvey | 705/28 |
| 5,103,368 A | 4/1992 | Hart | |
| 5,138,559 A | 8/1992 | Kuehl et al. | |
| 5,900,535 A | 5/1999 | Doe | |
| 6,029,514 A | 2/2000 | Adam et al. | |
| 6,293,145 B1 | 9/2001 | Wallrafen | |
| 6,367,325 B1 | 4/2002 | Schellenberg | |
| 6,516,661 B1 | 2/2003 | Spillman, Jr. et al. | |
| 6,690,475 B2 | 2/2004 | Spillman, Jr. et al. | |
| 2001/0010171 A1 | 8/2001 | Atkinson | |
| 2004/0117135 A1* | 6/2004 | Rogers et al. | 702/55 |
| 2006/0161374 A1* | 7/2006 | Hillam et al. | 702/130 |

* cited by examiner

*Primary Examiner*—Hezron Williams
*Assistant Examiner*—John Fitzgerald
(74) *Attorney, Agent, or Firm*—Cooper & Dunham LLP

(57) ABSTRACT

An apparatus for dynamically measuring a volume of fuel in a fuel tank of unknown geometry includes a fuel level sensor mounted on the fuel tank, a fuel meter for measuring a volume of fuel being consumed, and a rewritable look-up table storing correspondence between volumes of fuel and levels of fuel in the fuel tank. The loop-up table is rewritten as the oil in the tank is consumed. A system website is used for remotely monitoring the fuel tank of a building.

11 Claims, 6 Drawing Sheets

| Fuel Level in Tenths of Inches | Default Fuel Volume in Gallons | Learned Fuel Volume in Gallons |
|---|---|---|
| 696 | 7833 | 7833 |
| 695 | 7820 | 7826 |
| 694 | 7807 | 7815 |
| 693 | 7794 | 7804 |
| 692 | 7781 | 7792 |
| 691 | 7768 | 7776 |
| 690 | 7755 | 7765 |
| 689 | 7742 | 7750 |
| 688 | 7729 | 7736 |
| ... | ... | ... |
| 360 | 3411 | 3400 |

FIG. 2

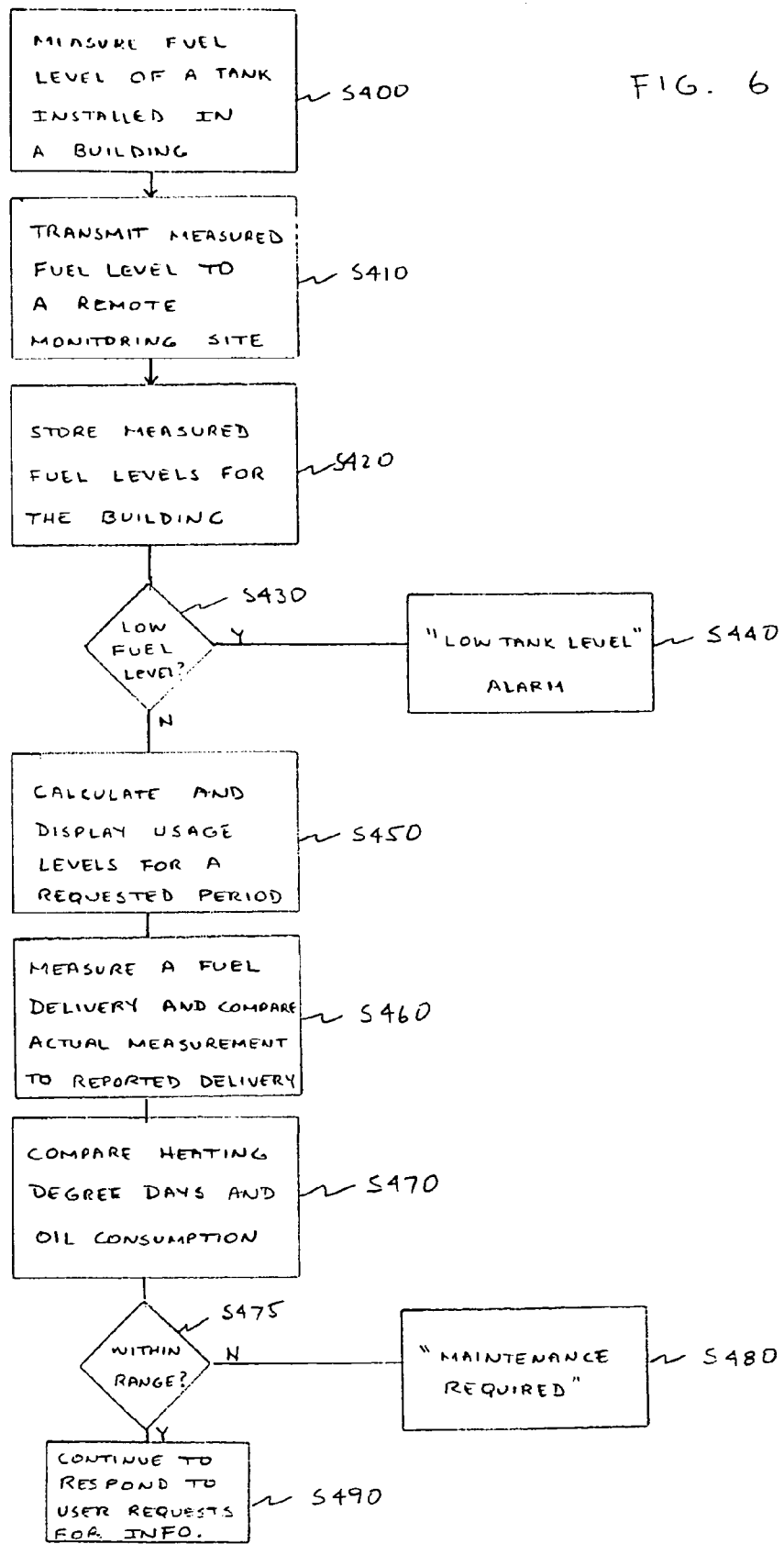

METHOD AND APPARATUS FOR MEASURING THE VOLUME OF FUEL IN A TANK

BACKGROUND OF THE INVENTION

This invention relates generally to the field of measuring the amount of fuel in a tank. More particularly, this invention relates to a method and apparatus for measuring and monitoring via a system website the volume of fuel in an irregularly shaped tank.

Previously proposed systems have used pressure based level sensors. These systems measure the weight of the oil in the tank and inaccuracies in the measurements are introduced because different grades of oil have different densities. For example, the density of No. 6 oil varies significantly among lots requiring the re-calibration of these systems after each oil delivery.

Further, previously proposed systems have handled the conversion from fuel level measurements to fuel volume using a standard look-up table based on the ideal geometry of the tank.

A problem with these previously proposed systems is that the actual geometry of the tank varies significantly because its dimensions are not generally held to tight tolerances. Further, many fuel tanks are buried in the ground or installed in places that make it impossible to measure the actual shape of the tank.

SUMMARY OF THE INVENTION

It is an object of the present invention to provide an apparatus to dynamically measure a volume of fuel in a fuel tank of unknown geometry.

It is another object of the present invention to provide a method for dynamically measuring a volume of fuel in a fuel tank of unknown geometry.

It is a still further object of the present invention to provide a system for remotely monitoring a fuel tank of a building.

It is a feature of the present invention to provide a rewritable look-up table storing correspondences between volumes of fuel and levels of fuel in the tank.

It is another feature of the present invention to provide a system website to connect a user via the Internet to the system for remotely monitoring a fuel tank of a building.

It is an advantage of the present invention that the geometry of the tank does not need to be known in advance.

These and other objects, advantages, and features of the present invention will become apparent to those skilled in the art upon consideration of the following description of the invention.

According to one aspect of the present invention an apparatus for dynamically measuring a volume of fuel in a fuel tank is provided, including a fuel level sensor mounted on the fuel tank, a fuel meter configured to produce an electrical indication when a predetermined volume of fuel passes through the fuel meter, a rewritable memory for storing a look-up table, wherein the look-up table stores correspondences between volumes of fuel in the fuel tank and levels of fuel in the fuel tank, and a controller configured to receive outputs from the fuel level sensor and the fuel meter and for controlling the rewritable memory, wherein when the controller detects the electrical indication from the fuel meter, the controller calculates a current level of fuel from the output from the fuel level sensor and calculates a current volume of fuel by decrementing/incrementing a previous volume of fuel by the predetermined volume of fuel, and the controller rewrites the look-up table with the calculated current volume of fuel corresponding to the current level of fuel.

According to another aspect of the present invention a method is provided for dynamically measuring a volume of fuel in a fuel tank having a fuel level sensor mounted thereon, a fuel meter configured to produce an electrical indication when a predetermined volume of fuel passes through the fuel meter, a rewritable memory for storing a look-up table, wherein the look-up table stores correspondences between volumes of fuel and levels of fuel in the fuel tank, and a controller configured to receive outputs from the fuel level sensor and the fuel meter and for controlling the rewritable memory, the method comprising the steps of detecting the electrical indication from the fuel meter, calculating a current level of fuel from the output from the fuel level sensor, calculating a current volume of fuel by decrementing/incrementing a previous volume of fuel by the predetermined volume of fuel, and rewriting the look-up table with the calculated current volume of fuel corresponding to the current level of fuel.

According to a still further aspect of the present invention a system for remotely monitoring a fuel tank of a building is provided including a fuel gauge mounted on a fuel tank of a building and provided with a wireless transmitter for transmitting fuel level measurements, and a computer for receiving the fuel level measurements transmitted by the fuel gauge, wherein the computer calculates whether a measured fuel level is below a predetermined level and issues an alarm in response to the calculation.

The features of the invention believed to be novel are set forth with particularity in the appended claims. The invention itself, however, both as to organization and method of operation, together with further objects and advantages thereof, may be best understood by reference to the following description taken in conjunction with the accompanying drawings.

BRIEF DESCRIPTION OF THE DRAWINGS

FIG. 2 is an example of a look-up table according to an embodiment of the present invention;

FIG. 6 is a flowchart showing a method for remotely monitoring a building according to another embodiment of the present invention.

DETAILED DESCRIPTION OF THE INVENTION

Figure 1:
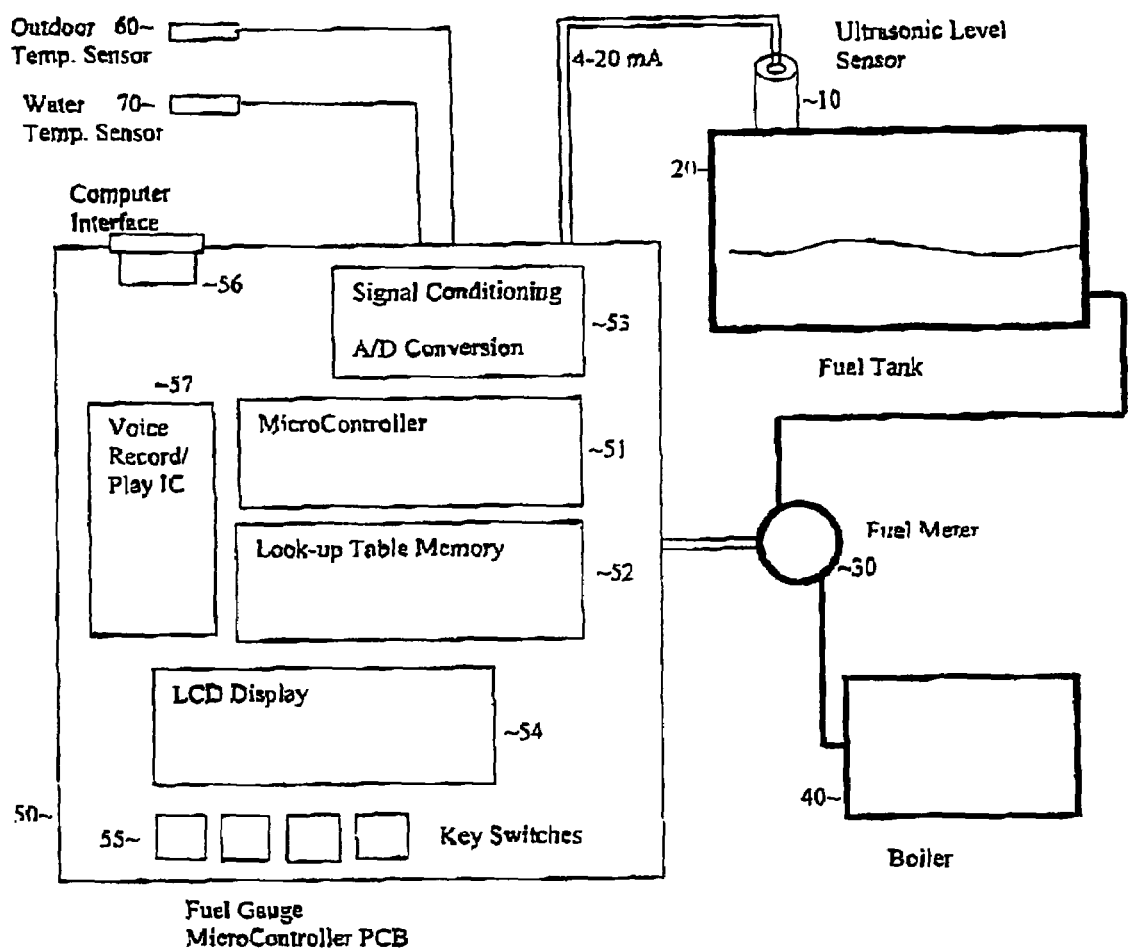
FIG. 1 is a block diagram of the apparatus for measuring a volume of fuel in a fuel tank according to an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Turning now to FIG. 1, an embodiment of the apparatus for measuring the volume of fuel in a tank includes a loop-powered ultrasonic level sensor 10 mounted on the top of a fuel tank 20 and connected to a fuel gauge controller board 50.

The loop-powered ultrasonic level sensor 10, in this embodiment of the present invention, provides a 4-20 mA current signal with 20 mA representing the oil level at 6 inches from the sensor (tank full) and 4 mA representing the oil level at 126 inches from the sensor. This scaling enables the use of the loop-powered ultrasonic level sensor 10 in tanks that are less or equal to 120 inches tall.

The loop-powered ultrasonic level sensor 10 could be a COSENSE LL-395 series sensor, for example. Other level sensors producing a 4-20 mA or 0-5V output could be used and other sensors with different scalings could also be used to accommodate larger tanks.

The fuel gauge controller board 50 is a microcontroller PCB having as an input the 4-20 mA current signal from the loop-powered ultrasonic level sensor 10. The controller board 50 includes a signal conditioning and A/D conversion circuit 53, a microcontroller 51, a look-up table memory 52, an LCD display 54, user input key switches 55, a computer interface 56, and a voice record/play IC 57.

The signal conditioning and A/D conversion circuit 53 converts the 4-20 mA current signal input into a digital value representing the oil level in tenths of inches. For example, a digital value of 223 represents 22.3 inches.

The look-up table memory 52 stores a look-up table initially loaded with default values, when available, based on the ideal geometry of the tank and supplied by the tank manufacturer or calculated from the tank geometry.

The controller board 50 could be designed around a microchip PIC18F452 microcontroller and the computer interface 56 could be a MAXIM MAX232 integrated circuit. Further, the LCD display 54 could be an OPTREX 51553 and the user input key switches 55 could be of the E-SWITCH SERIES 320 type, for example.

An in-line fuel meter 30 is installed between a boiler 40 and the fuel tank 20 for measuring the flow of fuel from the tank 20 to the boiler 40. The in-line fuel meter 30 provides an electrical contact closure indication or "meter tick" to the microcontroller 51 for each tenth of a gallon, for example, of fuel that passes through the fuel meter 30. The fuel meter 30 could be an ISTEC model 9215 with a dry contact signal output.

The user sets up and monitors the system operation directly via the LCD display 54 and the user input key switches 55 of the controller board 50.

The computer interface 56 is provided so that the controller board 50 can be connected to a PC (not shown) to manage the system.

The voice record/play IC 57 may be used to play a pre-recorded alarm warning or to play a notification message over a telephone line (not shown) after dialing a pre-programmed alarm dial-out telephone number.

Temperature sensors 60 and 70 are connected to the controller board 50 to monitor outdoor and hot water temperatures, respectively. The outdoor and hot water temperatures can be used to improve the operating efficiency of the heating system.

Heating degree days can be calculated using the outdoor temperature sensor 60 and compared to the actual fuel usage. When the fuel usage and the degree days do not correlate, a warning can be issued informing the user that the heating system is operating inefficiently and requires maintenance.

The apparatus for measuring the volume of fuel in a tank shown in the embodiment of FIG. 1 is designed to produce an on-site learned look-up table 100 such as the one shown in FIG. 2.

The on-site learned look-up table 100 providing a translation between the measured fuel level and the fuel volume is produced during the normal operation of the system without a need for shutting down the system and emptying the tank 20. The fuel meter 30 that measures fuel flow from the tank 20 to the boiler 40 is used to determine the volume differences between incremental levels as the system is using the oil, thereby dynamically producing the on-site learned look-up table 100.

Figure 3:
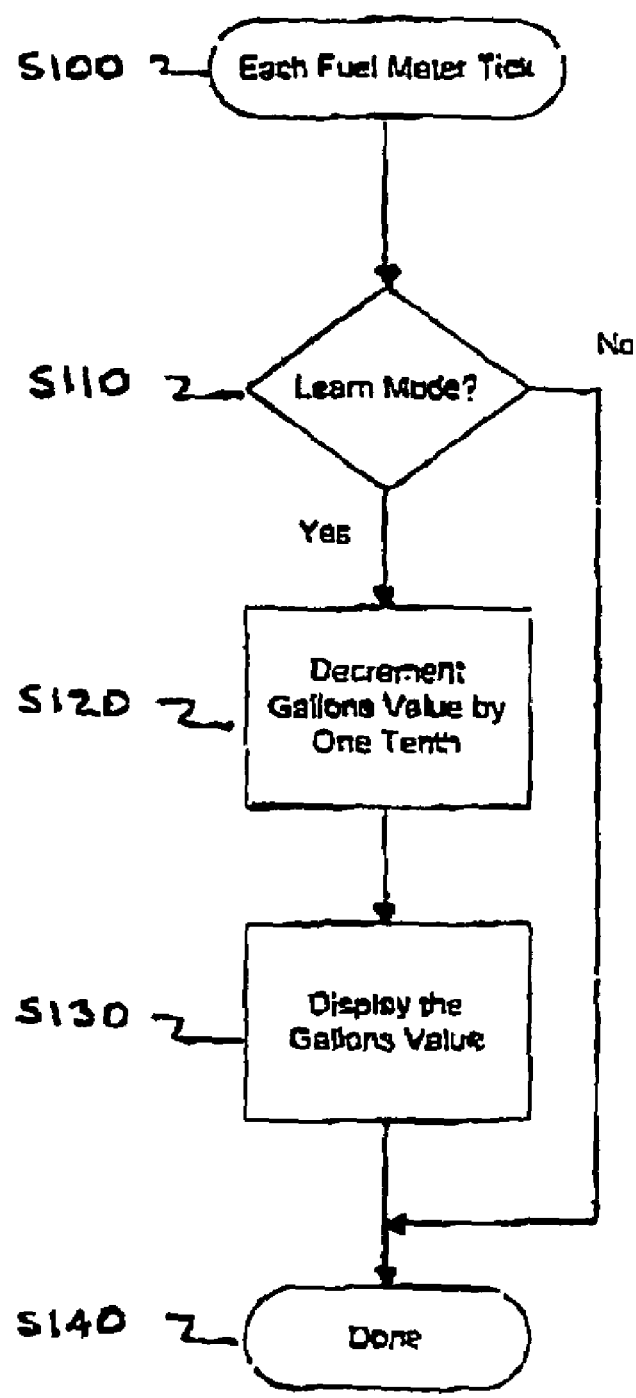
FIG. 3 is a flowchart showing a method for measuring a volume of fuel in a fuel tank according to an embodiment of the present invention.

Turing now to FIGS. 3 and 4, the method for producing the on-site learned look-up table 100, shown in FIG. 2, will be described.

At the request of the user, the microcontroller 51 can be set to operate in a "learn mode". In the "learn mode" when the fuel level measured by the sensor 10 becomes lower than the previous level by one "level increment or meter tick", in this embodiment by one tenth of an inch, the microcontroller 51 replaces the value for the current level in the on-site learned look-up table 100 stored in the look-up table memory 52 with the value for the previous level minus the amount consumed between levels as will be described below. As shown in FIG. 3, each time a "meter tick" occurs in step S100 the microcontroller 51 checks whether the system has been set in the "lean mode" in step S110. If yes, the microcontroller 51 decrements the gallons value by the amount represented by one "meter tick", one tenth of a gallon in this embodiment, in step S120, then the microcontroller formats the data and displays the gallons value on the LCD display 54 in step S130 and proceeds to perform the steps shown in FIG. 4 via step S140.

Figure 4:
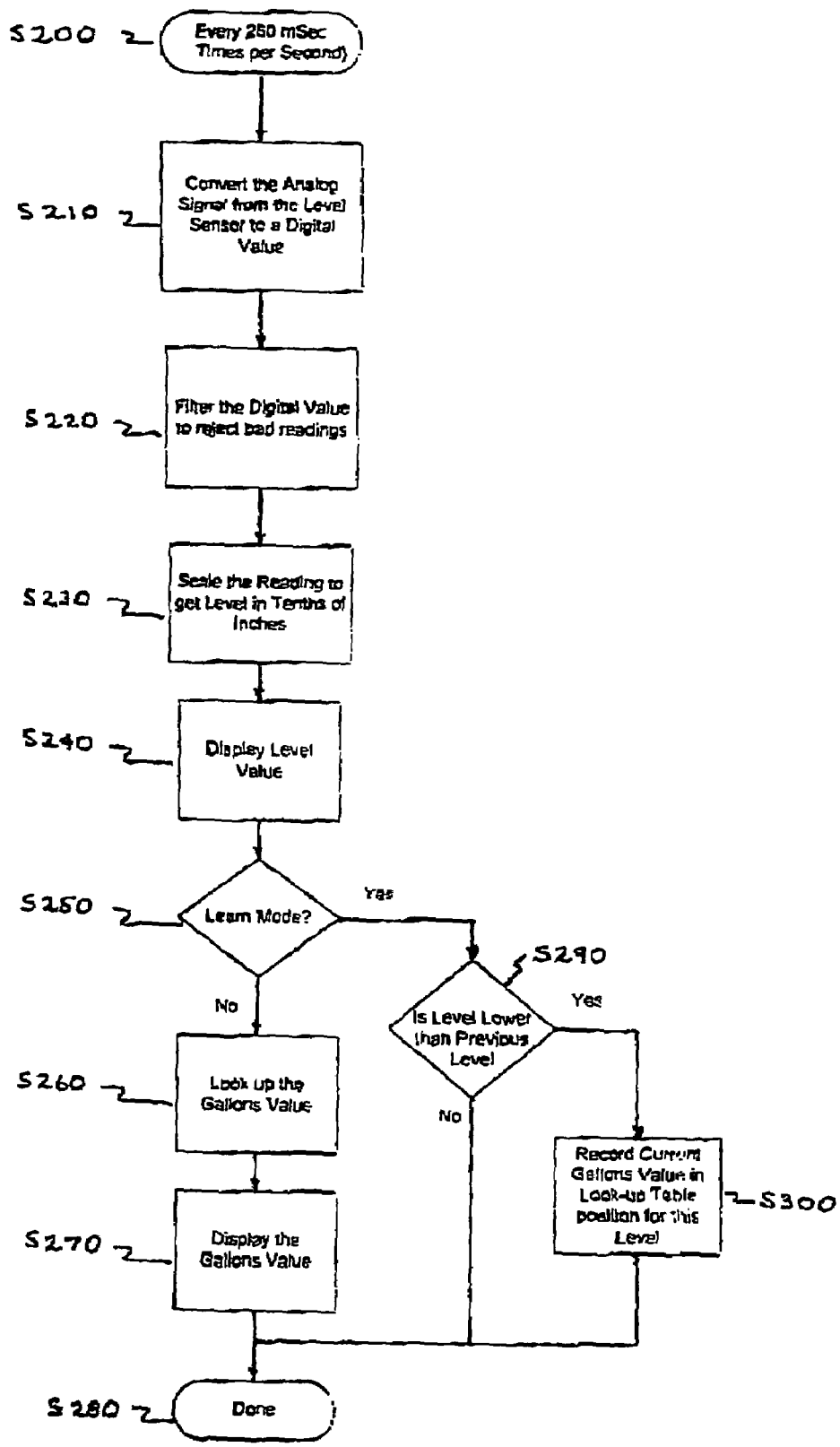
FIG. 4 is another flowchart showing a method for measuring a volume of fuel in a fuel tank according to an embodiment of the present invention.

As shown in FIG. 4, in step S200, every four times per second in this embodiment, the microcontroller 51 samples the output signal from the level sensor 10 by triggering an analog to digital (A/D) conversion in step S210. The resulting digital value is then filtered to reduce noise, reject bad readings, and smooth the transition from one reading to the next in step S220 using intelligent digital filtering. Next, the filtered reading is scaled to convert the reading to a level in tens of inches in step S230 and displayed on the LCD display 54 in step S240.

In step S250, the microcontroller 51 checks whether the system is in the "learn model". If the system is in the "learn model", the microcontroller 51 checks whether the current fuel level is lower than the previous level in step S290 and, if it is, the microcontroller 51 rewrites in step S300 the current gallons value, as measured by the fuel meter 30 and calculated by the microcontroller 51, in the look-up table 100. If the system is not in the "learn mode", the microcontroller 51 uses the current full level value and looks up the corresponding gallons value in the look-up table 100 in step S260, and displays the gallons value in step S270. As discussed above, when this process is completed in step S280 the process is repeated four times a second in this embodiment.

In addition to the core fuel volume measurement functions, the fuel gauge controller board 50, provides a variety of useful data accumulation and reporting functions.

For example, each boiler run can be timed and recorded and the data made available in a detailed fuel usage report that is useful in determining whether the boiler is operating properly.

Further, by producing a daily fuel usage report that shows fuel used during the daytime and nighttime periods of each day and comparing it with degree-day information, boiler inefficiencies can be identified.

Furthermore, a time and amount of fuel delivery report can be created by monitoring a sudden rise in fuel level.

Figure 5:
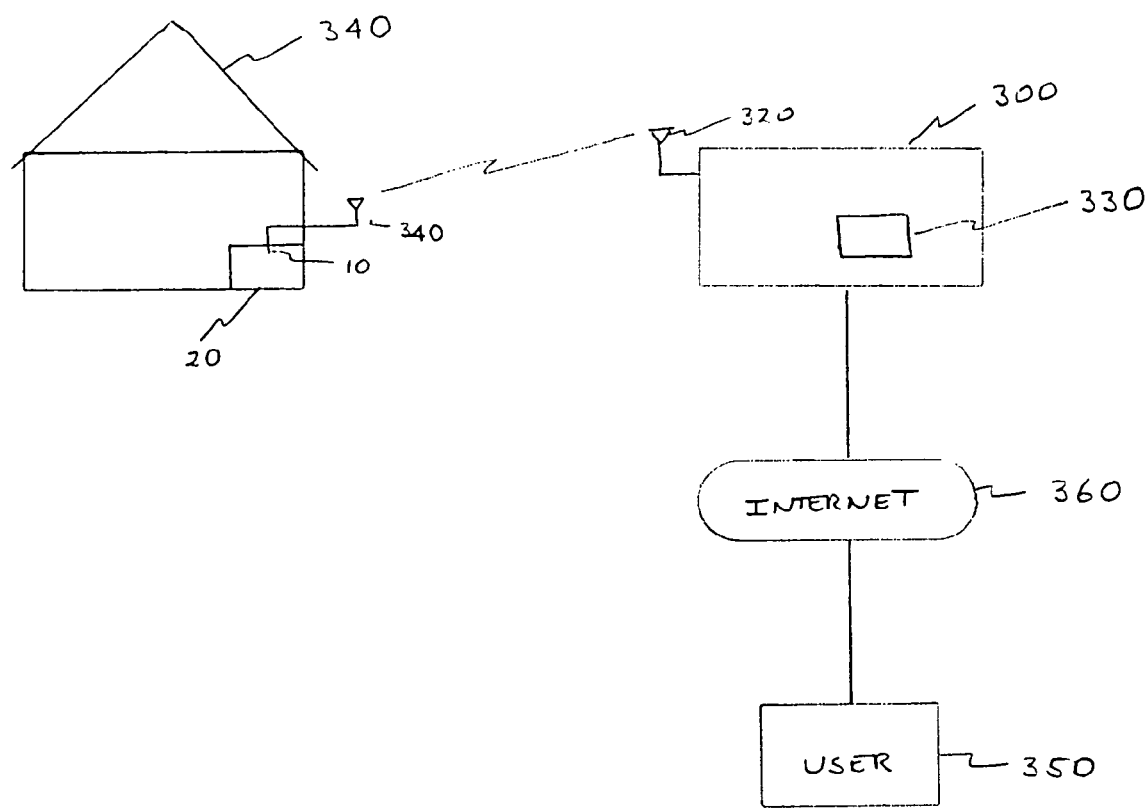
FIG. 5 is a block diagram of another embodiment of the present invention.

In another embodiment of the present invention, shown in FIG. 5, the level sensor 10 is a battery powered level sensor including a wireless transmitter 310. In this embodiment the fuel gauge controller 50 is located in a remote monitoring site 300, as shown in FIG. 5. The fuel gauge controller 50 in this embodiment includes a wireless receiver 320 to receive information from the fuel gauge 10.

In a further embodiment of the present invention the fuel gauge controller 50 communicates wirelessly with the remote monitoring site 300 using the wireless transmitter 310 connected to the computer interface 56 shown in FIG. 1.

The remote monitoring site 300 includes a computer 330 for monitoring the information transmitted from a building 340 via the wireless transmitter 310.

The computer 330 allows a user 350 to log-in to a system website for monitoring the building 340 using the Internet 360, for example. The computer 330 is configured to receive information and monitor several buildings.

The operation of the system for monitoring the building 340 implemented in the computer 330 located in the remote monitoring site 300 will be described using the flowchart of FIG. 6. It should be understood that the flowchart of FIG. 6 is a simplified flowchart and numerous other measurements and reports can be produced using this system.

In step S400 the fuel level of the tank installed in the building 340 is measured, this measurement is transmitted to the remote monitoring site 300 in step S410 and stored in a database of a computer 330. These steps are repeated at regular intervals such as in a daily basis, for example.

Numerous calculations and reports can be produced with this system, for example, the system can check whether the measured fuel level is below a predetermined level in step S430 and set a "low tank level" alarm in step S440 when this is the case.

The user 350 can request a fuel usage report from the system and the system calculates and displays usage levels for a requested time period in step S450.

The system measures a fuel delivery and compares this measurement to a reported delivery in step S460.

Heating degree days are compared to the oil consumption of the building in step S470 and when this comparison is not within predetermined parameters in step S475, a "maintenance required" message is displayed to the user 350 in step S480. The system will proceed to respond to other requests for information from the user 350 in step S490.

Thus, it is apparent that in accordance with the present invention, an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. For example, that a wireless level sensor could be used for remote monitoring of the fuel tank.

Accordingly, it is intended that the present invention embrace all such alternatives, modifications and variations as fall within the scope of the appended claims.

What is claimed is:

1. An apparatus for dynamically measuring a volume of fuel in a fuel tank, comprising:

a fuel level sensor mounted on said fuel tank;

a fuel meter configured to produce an electrical indication when a predetermined volume of fuel passes through said fuel meter;

a rewritable memory for storing a look-up table, wherein said look-up table stores correspondences between volumes of fuel in said fuel tank and levels of fuel in said fuel tank; and a controller configured to receive outputs from said fuel level sensor and said fuel meter and convert the output from said fuel level sensor into a fuel volume by utilizing said look-up table, wherein when said controller detects said electrical indication from said fuel meter, said controller calculates a current level of fuel from said output from said fuel level sensor and calculates a current volume of fuel by decrementing/incrementing a previous volume of fuel by said predetermined volume of fuel, and said controller rewrites said look-up table with said calculated current volume of fuel corresponding to said current level of fuel, and wherein the controller further calculates heating degree days and oil consumption, and issues an alarm when a result of a comparison of said heating degree days and said oil consumption is outside a predetermined range.

2. The apparatus as claimed in claim 1, wherein said fuel level sensor is a loop-powered ultrasonic level sensor.

3. The apparatus as claimed in claim 1, wherein said look up table is initially loaded with default correspondences between said volumes of fuel and said levels of fuel.

4. The apparatus as claimed in claim 1, wherein time and an amount of fuel delivered report is produced by monitoring sudden rises in fuel level.

5. The apparatus as claimed in claim 1, further comprising an outdoor temperature sensor connected to said controller and said controller calculates heating degree days based on an output from said outdoor temperature sensor.

6. The apparatus as claimed in claim 5, wherein said controller tracks said calculated heating degree days and corresponding fuel usage and outputs a maintenance warning when said correspondence is outside a predetermined range.

7. A system for remotely monitoring a fuel tank of a building, the system comprising:

a fuel gauge mounted on the fuel tank of the building and provided with a wireless transmitter for transmitting fuel level measurements; and a computer for receiving said fuel level measurements transmitted by said fuel gauge, wherein said computer calculates whether a measured fuel level is below a predetermined level and issues an alarm in response to said calculation, wherein the computer further calculates heating degree days and oil consumption, and issues an alarm when a result of a comparison of said heating degree days and said oil consumption is outside a predetermined range.

8. The system according to claim 7, wherein a user interacts via an Internet with said computer using a system website.

9. The system according to claim 7, wherein the computer further calculates and displays to a user a fuel usage report for a requested period of time in response to a user's request.

10. A system for remotely monitoring a fuel tank of a building, the system comprising:

a fuel gauge mounted on the fuel tank of the building and provided with a wireless transmitter for transmitting fuel level measurements; and a computer for receiving said fuel level measurements transmitted by said fuel gauge wherein said computer calculates whether a measured fuel level is below a predetermined level and issues an alarm in response to said calculation, wherein a user interacts via an Internet with said computer using a system website, wherein the computer further calculates and displays to a user a fuel usage report for a requested period of time in response to a user's request, and wherein the computer further calculates heating degree days and an oil consumption, and issues an alarm when a result of a comparison of said heating degree days and said oil consumption is outside a predetermined range.

11. A system for remotely monitoring a fuel tank of a building, the system comprising:

a fuel level sensor mounted on said fuel tank;

a fuel meter configured to produce an electrical indication when a predetermined volume of fuel passes through said fuel meter;

a rewritable memory for storing a look-up table, wherein said look-up table stores correspondences between volumes of fuel in said fuel tank and levels of fuel in said fuel tank; and a controller configured to receive outputs from said fuel level sensor and said fuel meter and convert the output from said fuel level sensor into a fuel volume by utilizing said look-up table, wherein when said controller detects said electrical indication from said fuel meter, said controller calculates a current level of fuel from said output from said fuel level sensor and calculates a current volume of fuel by decrementing/incrementing a previous volume of fuel by said predetermined volume of fuel, and said controller rewrites said look-up table with said calculated current volume of fuel corresponding to said current level of fuel, and said fuel gauge mounted on the fuel tank of the building is provided with a wireless transmitter for transmitting fuel level measurements, and further comprising a computer for receiving said fuel level measurements transmitted by said fuel gauge, wherein said computer calculates whether a measured fuel level is below a predetermined level and issues an alarm in response to said calculation, wherein a user interacts via an Internet with said computer using a system website, wherein the computer further calculates and displays to a user a fuel usage report for a requested period of time in response to a user's request, and wherein the computer further calculates heating degree days and an oil consumption, and issues an alarm when a result of a comparison of said heating degree days and said oil consumption is outside a predetermined range.

* * * * *